United States Patent
Dwivedi

(10) Patent No.: US 11,922,604 B2
(45) Date of Patent: Mar. 5, 2024

(54) CLASSIFIED TRUNCATION COMPENSATION

(71) Applicant: KONINKLIJKE PHILIPS N.V., Eindhoven (NL)

(72) Inventor: Shekhar Dwivedi, Willoughby Hills, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 526 days.

(21) Appl. No.: 15/518,596

(22) PCT Filed: Oct. 20, 2015

(86) PCT No.: PCT/IB2015/058063
§ 371 (c)(1),
(2) Date: Apr. 12, 2017

(87) PCT Pub. No.: WO2016/063211
PCT Pub. Date: Apr. 28, 2016

(65) Prior Publication Data
US 2017/0287113 A1    Oct. 5, 2017

Related U.S. Application Data

(60) Provisional application No. 62/065,903, filed on Oct. 20, 2014.

(51) Int. Cl.
| | |
|---|---|
| *G06T 5/00* | (2006.01) |
| *G06F 18/24* | (2023.01) |
| *G06T 5/50* | (2006.01) |
| *G06T 7/11* | (2017.01) |
| *G06T 7/174* | (2017.01) |
| *G06T 11/00* | (2006.01) |

(52) U.S. Cl.
CPC ............. *G06T 5/005* (2013.01); *G06F 18/24* (2023.01); *G06T 5/001* (2013.01); *G06T 5/50* (2013.01);
(Continued)

(58) Field of Classification Search
CPC ........... G06T 5/001; G06T 5/005; G06T 5/50; G06T 7/11; G06T 7/174;
(Continued)

(56) References Cited

U.S. PATENT DOCUMENTS 8,013,307 B2    11/2011   Ye
9,256,780 B1 *   2/2016   DeBattista ......... G06K 9/00389
(Continued)

FOREIGN PATENT DOCUMENTS

WO    2009/138898    11/2009
WO    2010/032168    3/2010
(Continued)

OTHER PUBLICATIONS

Blumhagen et al., "Field of view extension and truncation correction for MR-based human attenuation correction in simultaneous MR/PET imaging", Feb. 2014, American Association of Physicists in Medicine, Medical Physics, vol. 41, is. 2, p. 022303-1-022303-9. (Year: 2014).*

(Continued)

*Primary Examiner* — Vincent Rudolph
*Assistant Examiner* — Timothy Choi

(57) ABSTRACT

PET/MR images are compensated with simplified adaptive algorithms for truncated parts of the body. The compensation adapts to a specific location of truncation of the body or organ in the MR image, and to attributes of the truncation in the truncated body part. Anatomical structures in a PET image that do not require any compensation are masked using a MR image with a smaller field of view. The organs that are not masked are then classified as types of anatomical structures, the orientation of the anatomical structures, and type of truncation. Structure specific algorithms are used to compensate for a truncated anatomical structure. The compensation is validated for correctness and the ROI is filled in (Continued)

where there is missing voxel data. Attenuation maps are generated from the compensated ROI.

13 Claims, 6 Drawing Sheets

(52) U.S. Cl.
CPC ............... *G06T 7/11* (2017.01); *G06T 7/174* (2017.01); *G06T 11/008* (2013.01); *G06T 2207/10088* (2013.01); *G06T 2207/10104* (2013.01); *G06T 2207/20152* (2013.01); *G06T 2207/20224* (2013.01); *G06T 2211/432* (2013.01); *G06V 2201/03* (2022.01)

(58) Field of Classification Search
CPC . G06T 2207/10088; G06T 2207/10104; G06T 2207/20152; G06T 2207/20224; G06T 11/008; G06T 2211/432; G06K 9/6267; G06K 2209/05
See application file for complete search history.

(56) References Cited

U.S. PATENT DOCUMENTS

| | | | | |
|---|---|---|---|---|
| 2008/0135769 | A1* | 6/2008 | Rosen | G01T 1/1603 250/363.09 |
| 2011/0007958 | A1* | 1/2011 | Salomon | G06T 7/149 382/131 |
| 2011/0080168 | A1* | 4/2011 | Fenchel | A61B 6/5247 324/309 |
| 2014/0185893 | A1* | 7/2014 | Ambwani | G01R 33/481 382/131 |
| 2015/0023575 | A1* | 1/2015 | Valadez | G06T 7/11 382/131 |

FOREIGN PATENT DOCUMENTS

| | | |
|---|---|---|
| WO | 2010/095062 | 8/2010 |
| WO | 2012/160520 | 11/2012 |

OTHER PUBLICATIONS

Hu and Ojha et al., "MR-based Attenuation Correction for a Whole-body Sequential PET/MR System", Dec. 2009, IEEE, 2009 IEEE Nuclear Science Symposium Conference Record, p. 3508-3512. (Year: 2009).*

Blaffert, et al., "Comparison of threshold-based and watershed-based segmentation for the truncation compensation of PET/MR images", Proceedings of SPIE; vol. 8314, Feb. 10, 2012.

Schramm, et al., "Influence and Compensation of Truncation Artifacts in MR-Based Attenuation Correction in PET/MR", IEEE Transactions on Medical Imaging, vol. 32, No. 11, Nov. 1, 2013.

* cited by examiner

CLASSIFIED TRUNCATION COMPENSATION

CROSS REFERENCE TO RELATED APPLICATIONS

This application is the U.S. National Phase application under 35 U.S.C. § 371 of International Application No. PCT/IB2015/058063, filed Oct. 20, 2015, published as WO 2016/063211 on Apr. 28, 2016, which claims the benefit of U.S. Provisional Patent Application No. 62/065,903 filed Oct. 20, 2014. These applications are hereby incorporated by reference herein.

FIELD

The present application relates generally to medical imaging. It finds particular application in conjunction with magnetic resonance (MR) systems and positron emission tomography (PET), and will be described with particular reference thereto. However, it is to be understood that it also finds application in other usage scenarios and is not necessarily limited to the aforementioned application.

BACKGROUND

Truncation compensation in PET/MR imaging is a challenging and interesting problem. The current solution complicates the problem. The current solution for truncation compensation does not adapt to the specifics and characteristics of truncation in general, and truncation at different parts of the body in particular. The present method compensates for truncation by considering every incoming dataset as a black box, and applies a single algorithm on the entire human body. However, this approach is neither reliable and nor accurate.

SUMMARY

The present application proposes a truncation compensation methodology that adapts to a specific location of truncation (organ or location in human body), and attributes of truncation occurring in that part of the body. Before executing the compensation, information is derived concerning a region of interest to apply compensation using a unique classification technique. Algorithms adapt to different parts of the body that encounter truncation from MR scanning and field of view constraints.

In accordance with one aspect, a truncation compensation system, comprising: a PET image memory configured to store a volume of PET imaging data and a MR image memory configured to store a volume of MR imaging data having a MR field of vision (FOV). The system includes one or more processors configured to: mask the volume of the PET imaging data with the volume of the MR imaging data to generate a masked image of truncated regions of interest (ROIs); classify the masked image as types of anatomical structures outside the MR FOV; and compensate for truncation in the truncated ROIs based on the anatomical structure in the masked image outside the MR FOV to generate compensated ROIs.

In accordance with another aspect, a method for compensating truncated PET images, the method including: receiving a volume of PET imaging data of a patient and receiving a volume of truncated MR imaging data of a patient having a MR field of vision (FOV). The method further includes masking the volume of the PET imaging data with the volume of the MR imaging data to generate a masked image of truncated regions of interest (ROIs). Next, the method includes classifying the masked image as types of anatomical structures outside the MR FOV. Last, the method includes compensating for truncation in the truncated ROIs based on the anatomical structure in the masked image outside the MR FOV to generate compensated ROIs.

In accordance with another aspect, a system for truncation compensation of a PET image, the system comprising: a processor configured to: mask the PET image with a smaller volume anatomical image to generate a masked image of truncated regions truncated in the anatomical region. The processor is further configured to identify anatomical structures in the masked image; retrieve an anatomical image model of at least one of the identified anatomical structures; and scale and convert the anatomical image model. The processor is further configured to combine the scaled and converted anatomical image model with the anatomical image; and generate an attenuation map from the combined scaled and converted anatomical image model and the anatomical image.

One advantage resides in more accurate truncation compensation.

Another advantage resides in less complex algorithms for truncation compensation.

Another advantage resides in validating the truncation compensation for accuracy.

Still further advantages of the present invention will be appreciated to those of ordinary skill in the art upon reading and understand the following detailed description

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
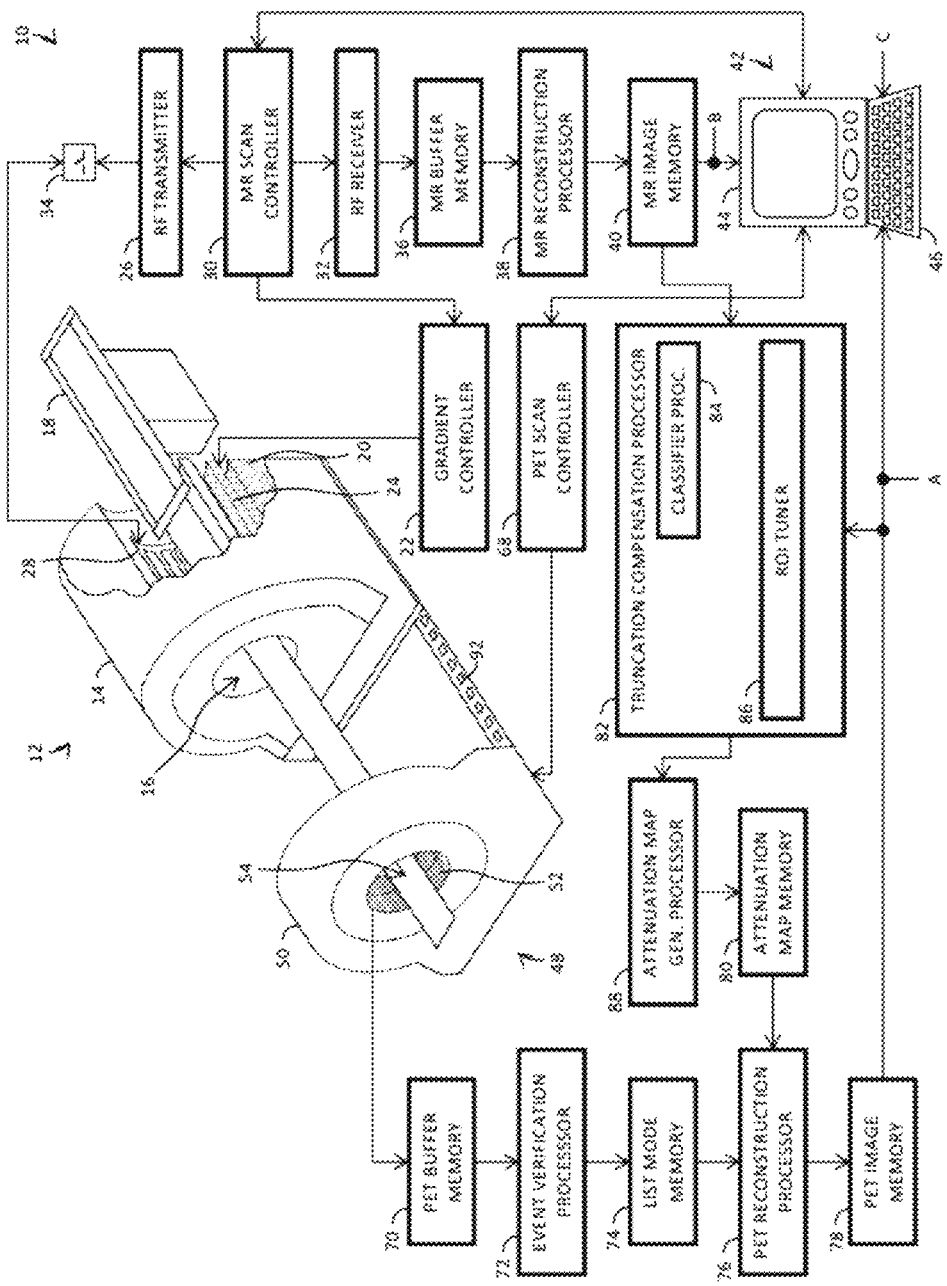
FIG. 1 diagrammatically depicts a hybrid PET/MR imaging system.

With reference to FIG. 1, an imaging system 10 includes an MR scanner 12. The MR scanner 12 generates raw MR scan data and includes a housing 14 defining an MR imaging volume 16 for receiving a target volume of a subject to be imaged. A subject support 18 to supports the subject and positions the target volume of interest near the isocenter of the MR imaging volume 16.

A main magnet 20 of the MR scanner 12 creates a strong, static $B_0$ magnetic field through the MR imaging volume 16. The strength of the static $B_0$ magnetic field is commonly one of 0.23 Tesla, 0.5 Tesla, 1.5 Tesla, 3 Tesla, 7 Tesla, and so on in the MR imaging volume 16, but other strengths are contemplated.

A gradient controller 22 of the MR scanner 12 is controlled to superimpose magnetic field gradients, such as x, y and z gradients, on the static $B_0$ magnetic field in the MR imaging volume 16 using a plurality of magnetic field gradient coils 24 of the MR scanner 12. The magnetic field gradients spatially encode magnetic spins within the MR imaging volume 16. Typically, the plurality of magnetic field gradient coils 24 includes three separate magnetic field gradient coils which spatially encodes in three orthogonal spatial directions.

Further, one or more transmitters 26 of the MR scanner 12 are controlled to transmit $B_1$ resonance excitation and manipulation radiofrequency (RF) pulses into the MR imaging volume 16 with one or more transmit coil arrays 28. The $B_1$ pulses are typically of short duration and, when taken together with the magnetic field gradients, achieve a selected manipulation of MR. For example, the $B_1$ pulses excite the hydrogen dipoles to resonance and the magnetic field gradients encode spatial information in the frequency and phase of the resonance signal. By adjusting the RF frequencies, resonance can be excited in other dipoles, such as phosphorous, which tend to concentrate in known tissues, such as bones.

An MR scan controller 30 controls the gradient controller 22 and/or the transmitters 26 according to imaging sequences to produce spatially encoded MR signals within the MR imaging volume 16. An imaging sequence defines a sequence of $B_1$ pulses and/or magnetic field gradients. Further, the imaging sequences can be received from a device or system being remote or local to the MR scan controller 30, such as a sequence memory.

One or more RF receivers 32, such as a transceiver, receive the spatially encoded magnetic resonance signals from the MR imaging volume 16 and demodulate the received spatially encoded magnetic resonance signals to MR data sets. The MR data sets include, for example, k-space data trajectories. To receive the spatially encoded magnetic resonance signals, the receivers 16 use one or more receive coil arrays 28. As illustrated, the receivers 32 share a whole body coil 28 with the transmitters 26 by way of a switch 34 that selectively connects the receivers 32 and the transmitters 26 to the coil 28 depending upon whether the transmitters 26 or the receivers 32 are being used. The receivers 32 typically store the MR data sets in an MR buffer memory 36.

An MR reconstruction processor 38 reconstructs the MR data sets into MR images or maps of the MR imaging volume 16. This includes, for each MR signal captured by the MR data sets, spatially decoding the spatial encoding by the magnetic field gradients to ascertain a property of the MR signal from each spatial region, such as a pixel or voxel. The intensity or magnitude of the MR signal is commonly ascertained, but other properties related to phase, relaxation time, magnetization transfer, and the like can also be ascertained. The MR images or maps are typically stored in an MR image memory 40.

An MR main controller 42 coordinates the generation of one or more MR diagnostic images of the target volume using one or more MR scans of the target volume. For example, the MR main controller 42 provides scan parameters to the MR scan controller 30. The MR main controller 42 can carry out the foregoing functionality by software, hardware or both. Where the MR main controller 42 employs software, the MR main controller 42 includes at least one processor executing the software. The software is suitably stored on a program memory. Further, the MR main controller 42 can be managed by a user using a graphical user interface presented to the user by way of a display device 44 and a user input device 46. The user can, for example, initiate imaging, display images, manipulate images, etc.

Notwithstanding that the MR reconstruction processor 38 and the MR scan controller 30 were illustrated as external to the MR main controller 42, it is to be appreciated that one or more of these components can be integrated with the MR main controller 42 as software, hardware or a combination of both. For example, the MR reconstruction processor 38 can be integrated with the MR main controller 42 as a software module executing on the at least one processor of the MR main controller 42. Further, notwithstanding that the MR buffer memory 36 and the MR image memory 40 were illustrated as external to the MR main controller 42, it is to be appreciated that one or more of these components can be integrated with the MR main controller 42.

A challenge with MR is that the field of view (FOV) is limited in MR imaging (e.g., to 50 to 55 centimeters (cm) in the trans-axial direction). In particular, $B_0$-homogeneity reducing at the edges of the FOV, and a non-linearity of the magnetic field gradients in the outer areas of the FOV, are responsible for the restriction of the FOV. This often leads to truncated anatomical structures (e.g., truncated arms and shoulders) in the outer areas of the FOV. This problem is exacerbated in the examination of larger and overweight subjects. Hence, an approach to truncation compensation is hereafter described.

With continued reference to FIG. 1, the imaging system 10 further includes a PET scanner 48. The PET scanner 48 generates PET data and includes a stationary gantry 50 housing a plurality of gamma detectors 52 arranged around a bore of the scanner. The bore defines a PET imaging volume 54 for receiving a target volume of a subject to be imaged. The detectors 52 are typically arranged in one or more stationery rings which extend the length of the PET imaging volume 54. However, rotatable heads are also contemplated. The detectors 52 detect gamma photons from the PET imaging volume 54 and generate the PET data. In some embodiments the PET and MR scanners are disposed in a common gantry with a common isocenter.

Figure 2:
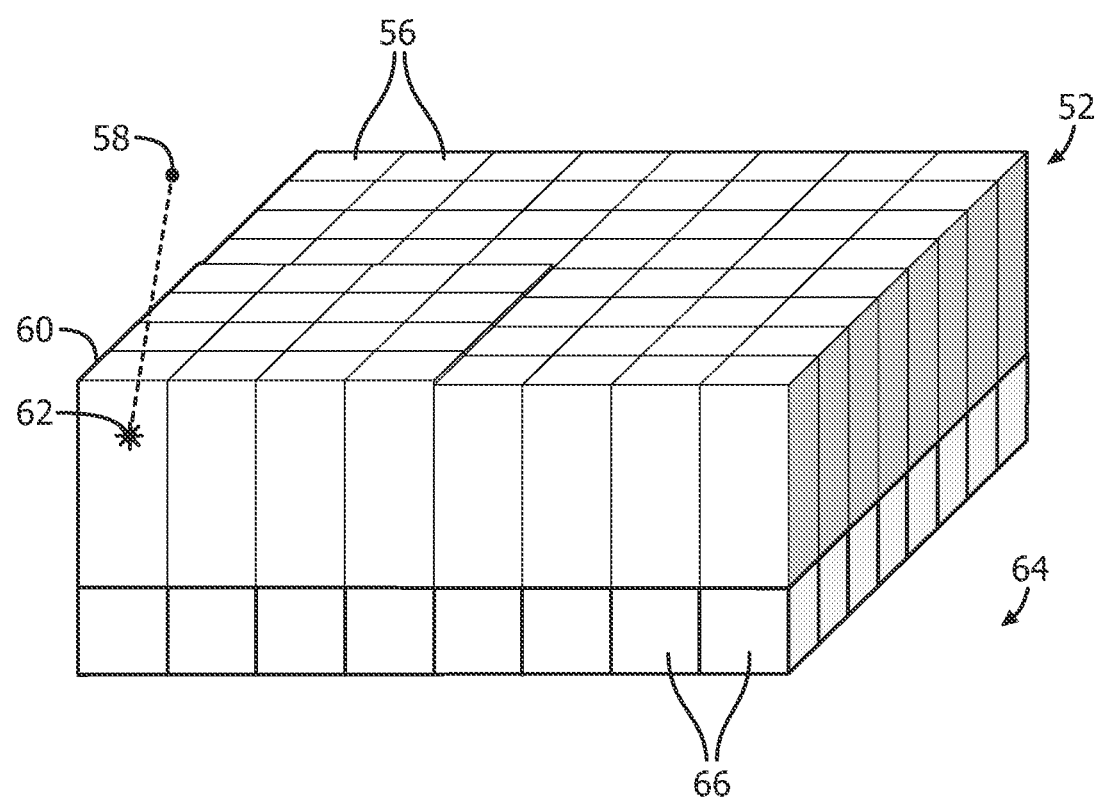
FIG. 2 illustrates a PET detector of the imaging system.

With reference to FIG. 2, each of the detectors 52 includes one or more scintillators 56 arranged in a grid. The scintillators 56 scintillate and generate visible light pulses in response to energy depositions by gamma photons. As illustrated, a gamma photon 58 deposits energy in a scintillator 60, thereby resulting in a visible light pulse 62. The magnitude of a visible light pulse is proportional to the magnitude of the corresponding energy deposition. Examples of scintillators 56 include sodium iodide doped with thallium (NaI(Tl)), cerium-doped lutetium yttrium orthosilicate (LYSO) and cerium doped lutetium oxyorthosilicate (LSO).

In addition to the scintillators 56, the detectors 52 each include a sensor 64 detecting the visible light pulses in the scintillators 56. The sensor 64 includes a plurality of light sensitive elements 66. The light sensitive elements 66 are arranged in a grid of like size as the grid of scintillators and optically coupled to corresponding scintillators 56. The light sensitive elements 66 can be coupled to the scintillators 56 in a one-to-one arrangement, a one-to-many arrangement, a many-to-one arrangement, or any other arrangement. Typically, as illustrated, the light sensitive elements 66 are silicon photomultipliers (SiPMs), but photomultiplier tubes (PMTs) are also contemplated.

Where the light sensitive elements 66 are SiPMs, there is typically a one-to-one correspondence between the scintillators 56 and the light sensitive elements 66, as illustrated, but other correspondences are contemplated. Each of the SiPMs includes a photodiode array (e.g., Geiger-mode avalanche photodiode arrays), each photodiode corresponding to a cell of the photodiode array. Suitably, the SiPMs are configured to operate in a Geiger mode to produce a series of unit pulses to operate in a digital mode. Alternatively, the SiPMs can be configured to operate in an analog mode. Where the light sensitive elements 66 are PMTs, there is often a many-to-one correspondence between the scintillators 56 and the light sensitive elements 66, but other correspondences are contemplated.

Referring back to FIG. 1, in preparation for a scan of a subject using the PET scanner 48, the subject is injected with a radiopharmaceutical or radionuclide which is preferentially drawn to a target volume. The radiopharmaceutical or radionuclide goes on annihilation event which causes a pair of gamma photons to be emitted in 180 degrees opposite directions from the target volume. The target volume is positioned in the PET imaging volume 54 using a subject support 18 corresponding to the PET scanner 48. Once the target volume is positioned within the PET imaging volume, the PET scanner 48 is controlled by a PET scan controller 68 to perform a scan of the target volume and gamma photon event data is acquired. The acquired event data describes the time, location and energy of each scintillation event detected by the detectors and is suitably stored in a PET buffer memory 70.

Subsequent to acquisition, or concurrently therewith, an event verification processor 72 filters the buffered event data. The filtering includes comparing energy (cell counts in the digital mode) of each scintillation event to an energy window, which defines the acceptable energy range for scintillation events. Those scintillation events falling outside the energy window are filtered out. Typically, the energy window is centered on the known energy of the gamma photons to be received from the PET imaging volume 54 (e.g., 511 kiloelectron volt (keV)) and determined using the full width half max (FWHM) of an energy spectrum generated from a calibration phantom. When two gamma photons are detected within a coincidence window, a line of response (LOR) is defined between the two corresponding scintillations. The LORs are reconstructed into a 3D PET image. The event verification processor 72 further generates lines of response (LORs) from the filtered event data. The coincidence window is small enough to ensure the gammas are from the same annihilation event. Hence, assuming that there is a one-to-one correspondence between scintillation events and gamma photons striking the detectors 52, a LOR can be defined by a pair of coincident scintillation events.

Data describing the coincident events, as determined by the event verification processor 72, is stored within a list mode memory 74 as a list, where each list item corresponds to a coincident event in order by time. The data for each of the list items describes the corresponding LOR by the spatial data for the two pixels in which the scintillations from the coincident pair of gamma photons of the LOR are localized. Further, the data for each of the list items can optionally describe the energy of the two gamma photons of the corresponding coincident event, and/or either the times stamps of the two gamma photons or the difference between the times stamps of the two gamma photons.

A PET reconstruction processor 76 reconstructs the list mode data into a final, reconstructed image of the target volume. The reconstructed image is typically stored in a PET image memory 78. To generate the reconstructed image, any suitable reconstruction algorithm can be employed. For example, an iterative-based reconstruction algorithm can be employed. The reconstruction can be performed with or without attenuation correction (AC). As to the former, an attenuation map from an attenuation map memory 80 is employed. In some instances, the AC is MR-based AC (i.e., MRAC) and the attenuation map is generated using the MR scanner 12. Further, the reconstruction can be performed with or without time of flight (ToF) localizations along the LORs.

A PET main controller 42 coordinates the generation of one or more PET diagnostic images of the target volume using one or more PET scans of the target volume. For example, the PET main controller 42 provides scan parameters to the PET scan controller 68. The PET main controller 42 can carry out the foregoing functionality by software, hardware or both. Where the PET main controller 42 employs software, the PET main controller 42 includes at least one processor executing the software. The software is suitably stored on a program memory. Further, the PET main controller 42 can be managed by a user using a graphical user interface presented to the user by way of a display device 44 and a user input device 46. The user can, for example, initiate imaging, display images, manipulate images, etc.

Notwithstanding that the PET reconstruction processor 76, the event verification processor 72, and the PET scan controller 68 are illustrated as external to the PET main controller 42, it is to be appreciated that one or more of these components can be integrated with the PET main controller 42 as software, hardware or a combination of both. For example, the PET reconstruction processor 76 and the event verification processor 72 can be integrated with the PET main controller 42 as a software module executing on the at least one processor of the PET main controller 42. Further, notwithstanding that the PET buffer memory 70, the list mode memory 74 and the PET image memory 78 were illustrated as external to the PET main controller 42, it is to be appreciated that one or more of these components can be integrated with the PET main controller 42.

As discussed above, the PET reconstruction processor 76 can perform image reconstruction with MRAC and an attenuation map generated using the MR scanner 12. A challenge posed by traditional systems employing MRAC is that the MR image used to derive the attenuation map is truncated. The MR imaging volume is smaller than the PET imaging volume. The size of the MR imaging volume is limited to the spatial regions inside where the gradients rollover and preferably are substantially linear to address this challenge, a truncation compensation processor 82 generates 84 a joint PET and MR histogram, typically with spatial and/or contextual data, and estimates 86 the truncated MR image values from the joint histogram. The complete MR image is then passed to an attenuation map generation processor 88 that generates an attenuation map used by the PET reconstruction processor 76 to generate an MRAC PET image. The attenuation map is typically stored in the attenuation map memory 80.

The PET gamma photons pass through and are attenuated by tissues outside of the MR field of view (FOV). To calculate the attenuation map more accurately, the attenuation attributable to the tissues outside MR FOV is approximated.

More specifically, the truncation compensation processor 82 receives a PET image of a target volume, typically from the PET image memory 78. Further, an MR image of the target volume is received, typically from the MR image memory 40. The PET image incorporates more of the target volume then the MR which is of a smaller region of the PET image. The MR and PET main controllers 42 can be used to coordinate the generation of the images. Further, the values of the MR and PET images are typically normalized and spatially clamped.

Figure 3:
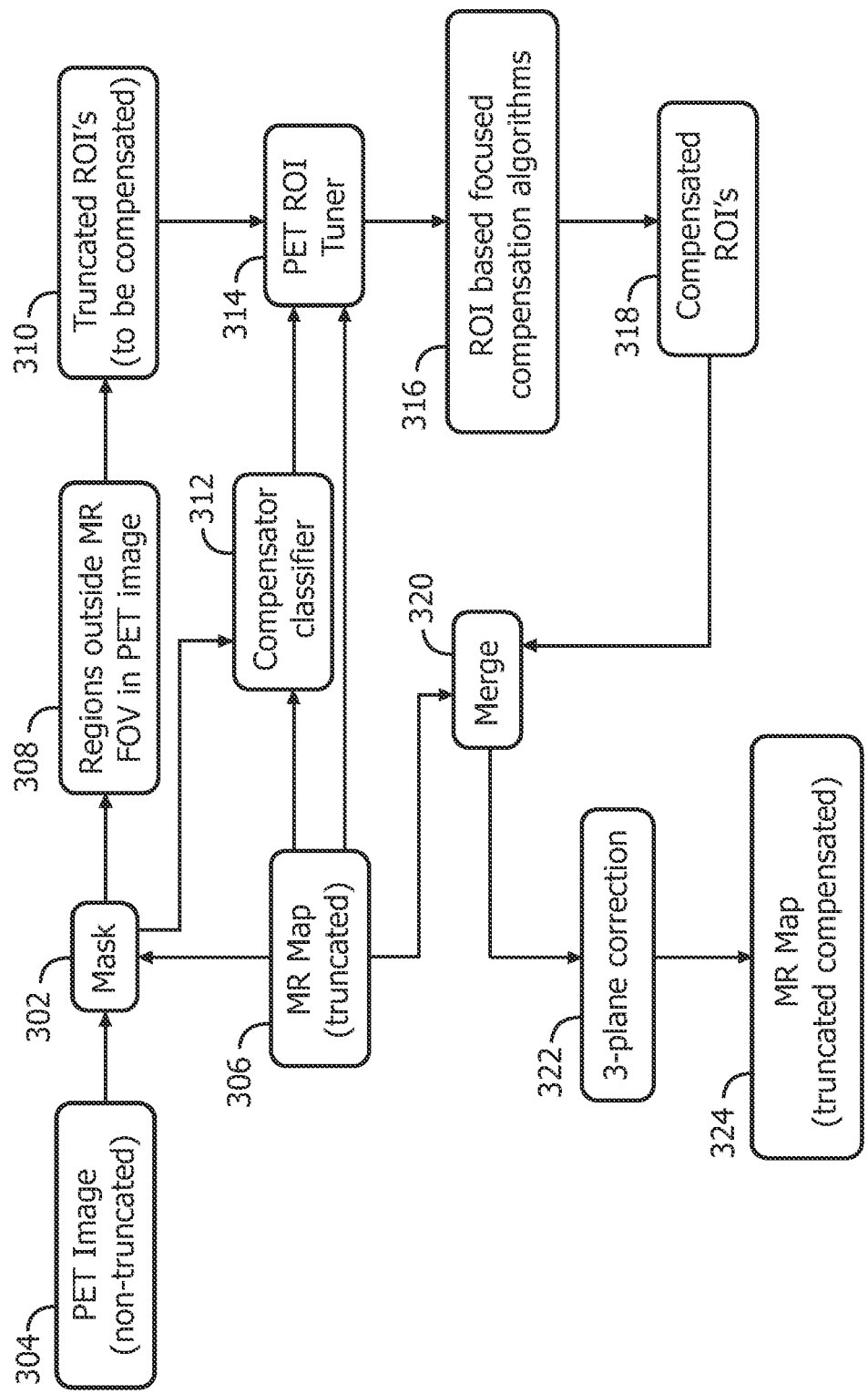
FIG. 3 illustrates a workflow for truncation compensation.

With reference to FIG. 3 and continuing reference to FIG. 1, the truncation compensation processor 82 masks 302 a raw PET image 304 with a MR Map 306 of the same patient. The masking 302 determines regions 308 of the PET image that are outside the MR field of vision (FOV) in the PET image.

Figure 4:
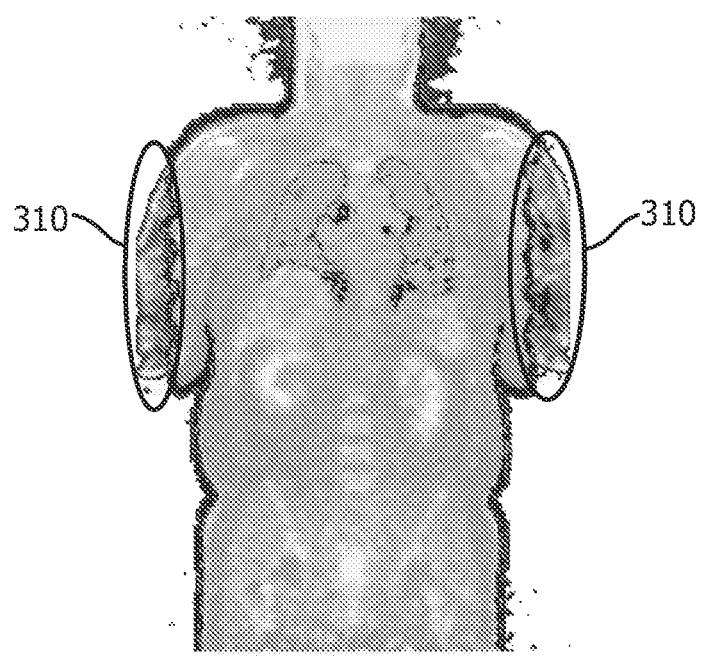
FIG. 4 illustrates a mask of PET and MR images.

The truncation compensation processor 82 generates truncated regions of interest (ROIs) 310 that are candidates for compensation. A truncated image (for example MR Map) and a non-truncated image (PET image) are used to illustrate a design of a classified truncation compensation system. The regions from the non-truncated image are identified using a masking operation with the truncated image. The content inside the MR FOV is masked from a PET image. The remaining regions are mapped to the spatially corresponding regions of the truncated MR image. These regions are denoted as truncated ROI's 310. With reference to FIG. 4, a masked image is shown where the truncated ROIs 310 are the regions outside the MR FOV. The truncation compensation processor 82 operates on the truncated ROI's instead of operating on the entire volume of a non-truncated image. Each truncated ROI has a specific characteristic of truncation and these characteristics are used in tuning the algorithm for compensation in the ROI. Such characteristics vary depending upon the truncation that is being observed.

The truncation compensation processor 82 includes a compensator classifier processor 84 to perform a classification method 312. The classification method localizes the truncation compensation for a particular patient to a category, e.g. respiratory, whole body (WB), cardiac, and/or breast. Each category is tuned to deal with the compensation in a particular way, which is more efficient, fast and adaptive. The classification process is driven by the MR Map and the PET image in addition to other heuristics. Several types of truncation are possible on a human body. The compensation classifier processor 84 categorizes the incoming dataset of truncated ROIs into a particular classes based on organ type, orientation and the like. Each specific class has special attributes of truncation that are then used in tuning the ROI's and aiding the compensation algorithm. In the example of FIG. 4, the truncated ROI is classified as an arm. In one embodiment, the compensator classifier 84 identifies classes depending upon the structure and characteristics of each truncated ROI, where there can be different classes for different ROI's such as structure, i.e. thickness, shape and size.

Figure 5:
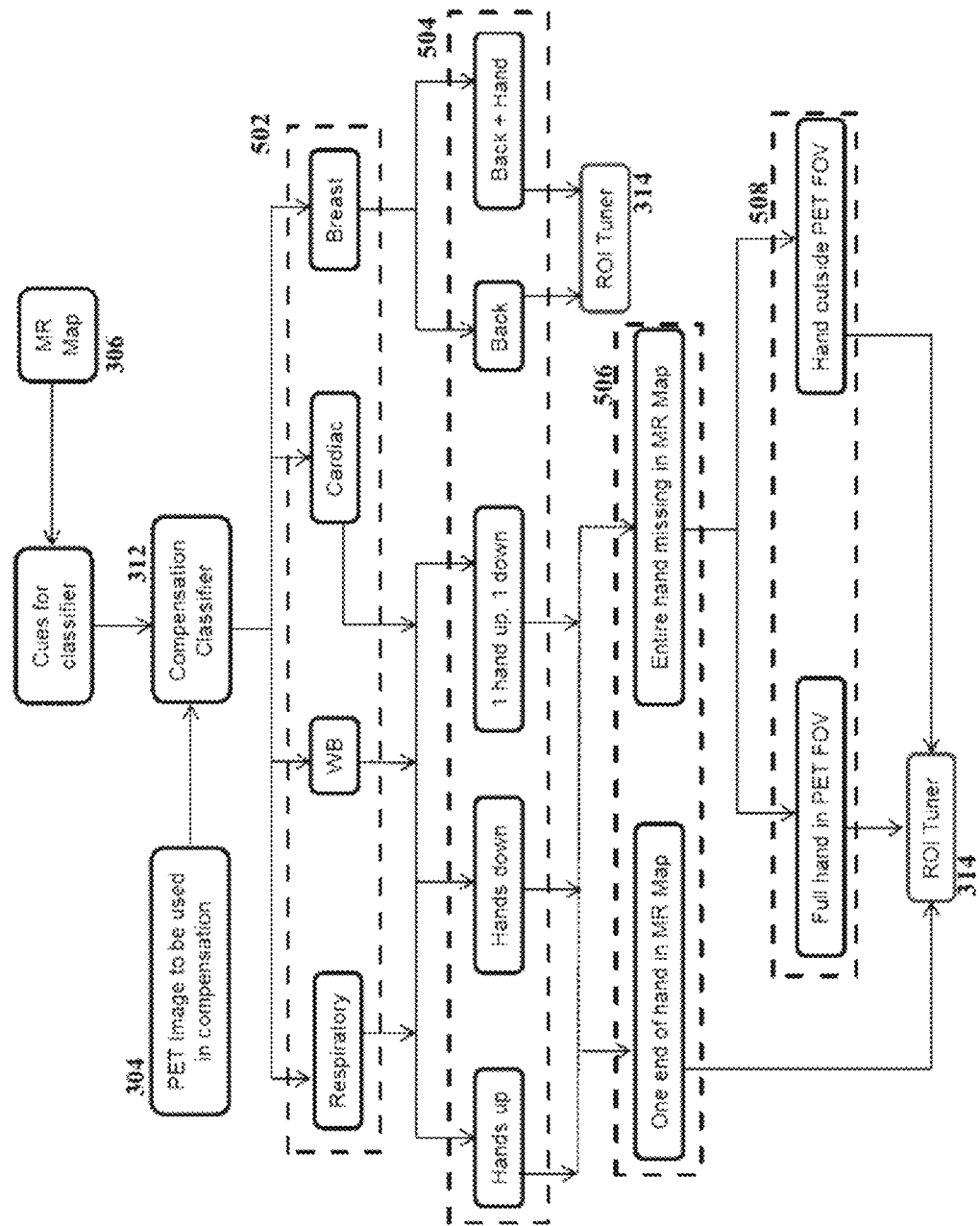
FIG. 5 illustrates a workflow for classification of truncated regions of interest.

With reference to FIG. 5, each path, i.e. from the compensation classifier 312 to a ROI tuner 314 represents a possible class. Each block along these paths has specific attributes that define the truncation for that particular class. These attributes also aid in tuning the ROIs for the compensation algorithm and guiding the algorithm itself to adapt according to the truncation classification. First, the compensator classifier processor 84 determines an organ classification 502 of ROI at a higher level, i.e. a respiratory ROI, a whole body (WB) ROI, a cardiac ROI, a breast ROI, and the like. For each organ type of ROI, the compensator classifier processor 84 determines an orientation classification 504, i.e. hands up, hands down, hands 1 up and 1 hand down, back, back and hand, and the like. Further classification sub-classifications 506, 508 exist for specific organs and orientations. For example, a hand orientation classification can be further classified according to partial data and no data in the MR Map, i.e. one end of the hand in the MR Map, the entire hand missing in MR Map. In one embodiment, if the entire hand is missing in the MR Map, a further sub-classification exists according to the hand depicted in the PET field of vision.

Each portion of the body that may encounter truncation in different scenarios is tuned with different algorithms and parameters. For instance truncation in a hand will have different characteristics compared to the truncation of the back. A ROI-based focused truncation compensation for different parts of the body is useful. After classification, the ROI tuner processor 86 tunes 314 the truncated ROIs 310 using ROI specific algorithms 316 for each organ of the body that needs compensation and the orientation of the organ, e.g. hand up/down/side. The PET ROI Tuner 314 accesses truncated ROIs 310. For a given case, the ROI tuner processor 86 operates in a different way for each category of compensator classifier 312. For example, the hand ROI is different for a case where both the hands are down compared to ROI in hand in a case where both hands are up. In this example, the PET ROI tuner 314 will tune the region of interest based on the classification category which results in compensated ROIs 318.

After compensation, the truncation compensation processor 82 merges 320 the compensated ROIs 318 with the original MR Map 306. The merging results in a MR Map that is compensated for truncation.

For example, once the truncated ROI is classified, a corresponding model of the truncated hand or other body regions is retrieved. Based on the PET image and other heuristics, the model is scaled in size and oriented to match the patient position. The scaled and oriented model is connected with the corresponding edge of the MR image. The values of the pixels of the model can represent MR values that are subsequently converted to attenuation values.

The truncation compensation processor 82 corrects 322 the merged MR Map for gaps that arise when merging overlapping ROIs, e.g. when portion of the model overlaps a portion of the MR image. The truncation compensation processor 82 also fills any gaps between two overlapping ROI's or a hole in a particular ROI, while merging the compensated regions from different ROIs. For example, missing voxels between the model and the MR image can be interpolated. The processor 82 analyses neighboring voxel locations in three dimensions, i.e. axial, coronal and sagittal views for each missing voxel, to estimate the value of each missing truncation voxel. The three dimensional correction results in a truncation compensated MR Map 324.

Notwithstanding that the truncation compensation processor 82 and the attenuation map generation processor 88 are illustrated as external to the PET and MR main controllers 42, it is to be appreciated that one or more of these components can be integrated with the main controllers 42 as software, hardware or a combination of both. Moreover, notwithstanding that the attenuation map memory 88 is illustrated as external to the main controllers 42, it is to be appreciated that the attenuation map memory 88 can be integrated with the main controllers 42.

Further, while the approach to truncation compensation is discussed in connection with PET and MR, it is to be understood that the same approach can be employed to compensate with any modality scanners employing hybrid imaging where one image is truncated relative to the other, the non-truncated image being used for truncation compensation.

Although not necessary, in some instances, the PET and MR scanners 12, 48 are combined into a hybrid scanner, as illustrated. In such instances, the PET and MR scanners 12, 48 share a main controller 42. Further, the PET scanner 48 can be mounted on tracks 92 to facilitate patient access. The tracks 92 extend in parallel to a longitudinal axis of a subject support 18 shared by both of the scanners 12, 48, thus enabling the scanners 12, 48 to form a closed system. A first motor and drive can provide movement of the PET scanner 48 in and out of the closed position, and a second motor and drive can also provide longitudinal movement and vertical adjustment of the subject support 18 in the imaging volumes 16, 54. Alternatively, the MR and PET scanners 12, 48 can be mounted in a single, shared closed system with a common imaging volume.

Figure 6:
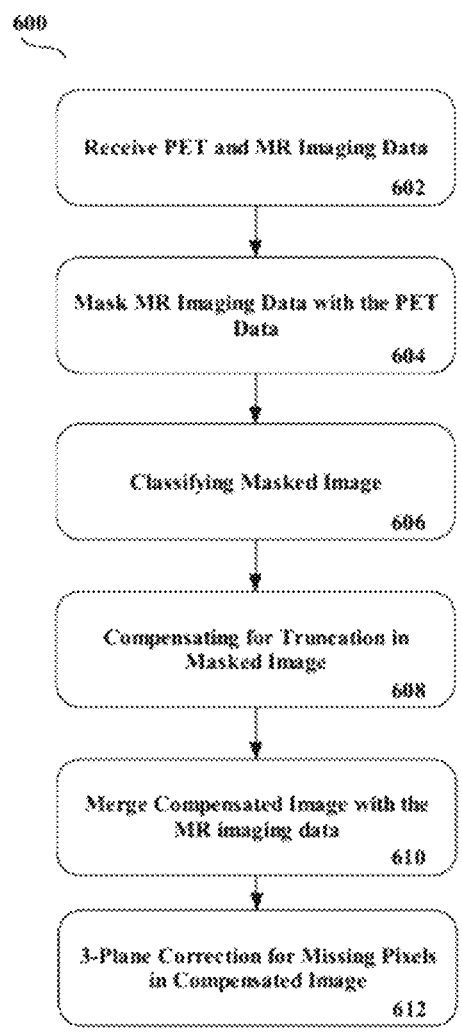
FIG. 6 illustrates a method for truncation compensation.

With reference to FIG. 6, a method for truncation compensation 600 is shown. At a step 602, PET and MR imaging data are received from the PET and MR scanners 12, 48. At a step 604, the PET imaging data is masked with the MR data to form a masked PET image, e.g. a PET image of the regions beyond the MR image. Truncated regions in the image are located in the masked image that are not removed from the masking step 604. At a step 606, the masked image is classified using a classification method. The classification method divides the masked image into regions of interest that may include truncated organs. The classification classifies the masked image into organs, orientation, and type of truncation, if any. That is, the anatomical structure truncated from the MR image is identified or classified as an arm, a hand, a back, or other one or more specific organs or other anatomical structures. At a step 608, truncated regions of interest are compensated using algorithms that are developed for the specific type of classification for the particular region of interest. For example, a specific compensation algorithm, such as watershed, is used to compensate for a hand that is facing up while a different algorithm is used to compensate for a hand facing down during the time the patient is scanned. As another example, a model, e.g. MR image, of the truncated anatomical structure is selected, scaled, and oriented based on the PET image in the MR truncated region. At a step 610, the compensated ROIs are merged back with the original MR imaging data to replace the truncated parts of the original MR imaging data. For example, the model is appended to the MR image in the location and with the orientation determined from the PET image. At a step 612, the merged MR data is corrected for missing voxels. Neighboring voxels are checked across three dimensions, i.e. axial, coronal, and sagittal.

As used herein, a memory includes any device or system storing data, such as a random access memory (RAM) or a read-only memory (ROM). Further, as used herein, a processor includes any device or system processing input device to produce output data, such as a microprocessor, a microcontroller, a graphic processing unit (GPU), an application-specific integrated circuit (ASIC), a FPGA, and the like; a controller includes any device or system controlling another device or system, and typically includes at least one processor; a user input device includes any device, such as a mouse or keyboard, allowing a user of the user input device to provide input to another device or system; and a display device includes any device for displaying data, such as a liquid crystal display (LCD) or a light emitting diode (LED) display.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A truncation cotnpensation system, comprising:
a PET image memory configured to store a volume of PET imaging data for a PET imaging volume;
a MR image memory configured to store a volume of MR imaging data having a MR field of vision (FOV), wherein the MR FOV is smaller than the PET imaging volume;
one or more processors configured to:
mask the volume of the PET imaging data with the volume of the MR imaging data to generate a masked PET image that includes one or more truncated regions of interest (ROIs) that are outside of the MR FOV;
identify the one or more truncated ROIs in the masked PET image from the masking of the volume of the PET imaging data with the volume of the MR imaging data;
classify the one or more truncated ROIs as types of anatomical structures that are outside the MR FOV based on structure and characteristics for each truncated ROI, the structure of each truncated ROI including a thickness, shape, and size of the corresponding truncated ROI;
classify each classified anatomical structure as to whether it is inside of or outside of a MR FOV of the PET imaging data;
compensate for truncation in the truncated ROIs based on the classified anatomical structure in the masked PET image that is outside the MR FOV to generate compensated ROIs; and
merge the compensated ROIs with the MR imaging data to form a compensated MR map.

2. The system according to claim 1, wherein the one or more processors are further configured to:
classify a plurality of anatomical structures in the masked PET image.

3. The system according to claim 1, wherein the one or more processors are further configured to:
compensitte for truncation in the truncated ROI of the MR imaging data using a classification specific truncation compensation for each truncated ROI.

4. The system according to claim 1, wherein the one or more processors are further configured to:
compensate for truncation in a truncated ROI with a watershed algorithm.

5. The system according to claim 1, wherein the one or more processors are further configured to:
analyze missing voxels in the compensated MR map across three-dimensions to estimate the missing voxels; and
correct the compensated MR map with the estimated voxels.

6. The system of claim 1, wherein the one or more processors are further programmed to:
classify die one or more truncated ROIs as types and orientations of anatomical structures outside the MR FOV; and
compensate for truncation in the truncated ROIs based on the anatomical structure in the masked image outside the MR FOV to generate the compensated ROIs by compensating for truncation in the truncated ROIs by scaling in size and orienting a classification-specific model of the classified anatomical structure in the masked image outside the MR FOV to generate compensated ROIs.

7. A non-transitory computer readable medium carrying instructions for controlling a processor to perform a method for compensating truncated MR images, the method including:
- masking a volume of PET imaging data of a patient with a volume of truncated MR imaging data of a patient having a MR field of vision (FOV) that is smaller than the PET imaging volume to generate a masked PET image that includes one or more truncated regions of interest (ROIs) that are outside of the MR FOV:
- identifying the one or more truncated ROIs in the masked PET image from the masking of the volume of the PET imaging data with the volume of the MR imaging data;
- classifying the one or more truncated ROIs as types of anatomical structures that are outside the MR FOV, the structure of each truncated ROI including a thickness, shape, and size of the corresponding truncated ROI;
- classifying an orientation of each classified anatomical structure as an up or down or side orientation; and
- comp ensating for truncation in the truncated ROI s using a classification specific trtmcation compensation for each trtmcned ROI based on the classified anatomical structure in the masked PET image that is outside the MR FOV to generate compensated ROIs using anatomical image models of the classified anatomical structures that are oriented to match the respective classified up or down or side orientations.

8. The non-transitory computer readable medium according claim 7, wherein the classifying of the one or more truncated ROIs as types of anatomical structures includes:
- classifying a plurality of anatomical structures in the masked PET image.

9. The non-transitory computer readable medium according to claim 7, wherein the classifying of the one or more truncated ROIs as types of anatomical structures includes:
- classifying each classified anatomical structure as to whether it is inside of or outside of a MR FOV of the PET imaging data.

10. The non-transitory computer readable medium according to claim 7, wherein the classifying of the one or more truncated ROIs as types of anatomical structures includes:
- classifying a type of truncation based on structure and characteristics for each truncated ROI.

11. The non-transitory computer readable medium according to claim 7, wherein the compensating includes:
- compensating for truncation in a truncated ROI with a watershed algorithm.

12. The non-transitory computer readable medium according to claim 7, wherein the method further includes:
- merging the compensated ROIs with the MR imaging data to form a compensated MR map.

13. The non-transitory computer readable medium according to claim 12, wherein the method further includes:
- analyzing missing voxels in the compensated MR map across three-dimensions to estimate the missing voxels; and
- correcting the compensated MR map with the estimated voxels.

* * * * *